United States Patent

Akutsu et al.

[11] Patent Number: 4,581,071
[45] Date of Patent: Apr. 8, 1986

[54] AQUEOUS INK FOR INK JET PRINTING

[75] Inventors: Eiichi Akutsu, Ichikawa; Kakuji Murakami, Shizuoka; Tamotsu Aruga, Numazu, all of Japan

[73] Assignee: Ricoh Company, Ltd., Tokyo, Japan

[21] Appl. No.: 708,651

[22] Filed: Mar. 6, 1985

[30] Foreign Application Priority Data

Mar. 22, 1984 [JP] Japan ............................. 59-53554

[51] Int. Cl.$^4$ ............................................. C09D 11/00
[52] U.S. Cl. .......................................... 106/22; 106/20
[58] Field of Search ............................. 106/22, 20, 23

[56] References Cited

FOREIGN PATENT DOCUMENTS 3344648  6/1984  Fed. Rep. of Germany .
3401982  8/1984  Fed. Rep. of Germany .

*Primary Examiner*—Amelia B. Yarbrough
*Attorney, Agent, or Firm*—Oblon, Fisher, Spivak, McClelland & Maier

[57] ABSTRACT

An aqueous ink is disclosed, which comprises a first magenta dye having the formula (I), a second magenta dye having the formula (II), a water-soluble organic solvent having a boiling point of 100° C. or higher, water and a preservative and anti-mold agent:

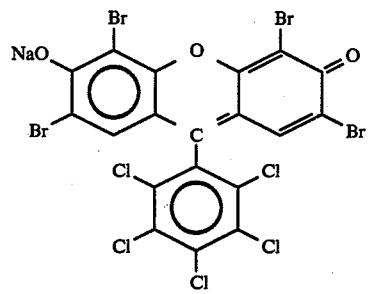

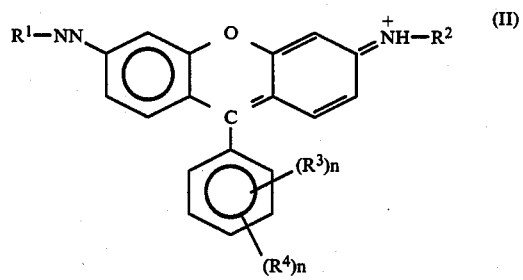

wherein $R^1$ and $R^2$ each represent

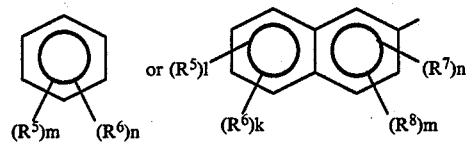

(in which $R^5$, $R^6$, $R^7$ and $R^8$ each represent a lower alkyl group, an amino group, a sulfonic acid group in the form of an alkali metal salt, or a carboxyl group in the form of an alkali metal salt); $R^3$ and $R^4$ each represent a lower alkyl group, an amino group, a sulfonic acid group in the form of an alkali metal salt, or a carboxyl group in the form of an alkali metal salt; and k, l, m and n each represent an integer of 0, 1 or 2.

6 Claims, No Drawings

AQUEOUS INK FOR INK JET PRINTING

BACKGROUND OF THE INVENTION

The present invention relates to an aqueous ink for ink jet printing by use of a dot printer and for use with ball point pens and fountain pens.

Conventionally, there is known an aqueous ink for ink jet printing in which a halogenated xanthene-type dye having the following formula (I) is employed:

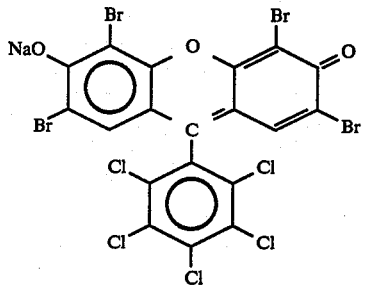
(I)

Although the above dye has an excellent color tone and high solubility in water and polyhydric alcohols, it has the shortcoming that it fades significantly when exposed to light.

There is also known an aqueous ink for ink jet printing in which another xanthene-type dye having the following formula (II) is employed:

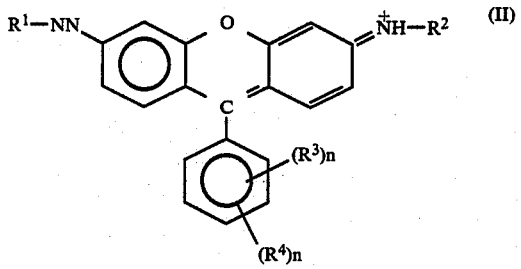
(II)

wherein $R^1$ and $R^2$ each represent

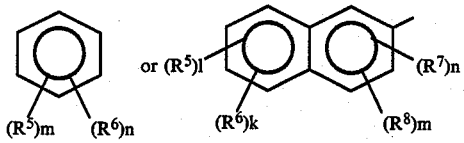

(in which $R^5$, $R^6$, $R^7$ and $R^8$ each represent a lower alkyl group, an amino group, a sulfonic acid group in the form of an alkali metal salt, or a carboxyl group in the form of an alkali metal salt); $R^3$ and $R^4$ each represent a lower alkyl group, an amino group, a sulfonic acid group in the form of an alkali metal salt, or a carboxyl group in the form of an alkali metal salt; and k, l, m and n each represent an integer of 0, 1 or 2.

The above dye having the formula (II) does not fade when exposed to light since it has high light resistance, but the color tone is slightly inferior to the first mentioned dye and the solubility in water and polyhydric alcohols is not as high as the first mentioned magenta dye.

Generally, it is preferable that magenta dyes have high spectral absorption peaks in a wavelength range of 500 nm to 600 nm. However, most magenta dyes have also spectral absorption in the base of the absorption curves, for instance, in the ranges of from 400 nm to 500 nm and from 600 nm to 700 nm and because of such spectral absorption, the color tone of such magenta dyes is not good. A magenta dye having a sharp peak in the first mentioned wavelength range, however, is somehow vulnerable to light and fades easily when exposed to light. Therefore it is not suitable for use as a dye of an ink jet printing ink.

SUMMARY OF THE INVENTION

It is therefore an object of the present invention to provide an aqueous magenta ink for ink jet printing which is particularly improved with respect to the color tone and light resistance as compared with conventional aqueous magenta inks.

According to the present invention, the above object is attained by an aqueous ink comprising a mixture of the previously discussed magenta dyes having the following formulas, a water-soluble organic solvent having a boiling point of 100° C. or higher, water and a preservative and anti-mold agent:

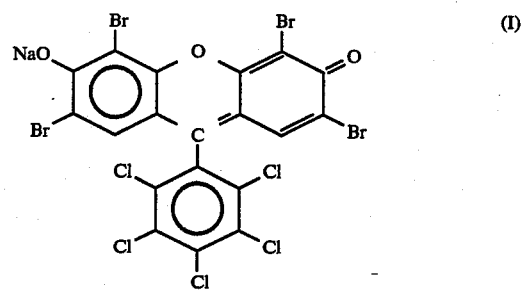
(I)

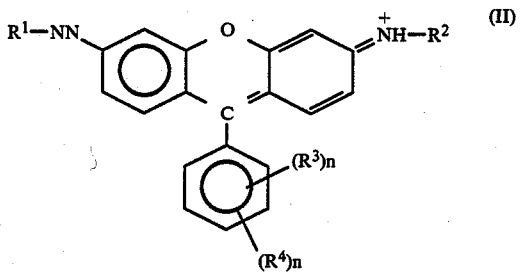
(II)

wherein $R^1$ and $R^2$ each represent

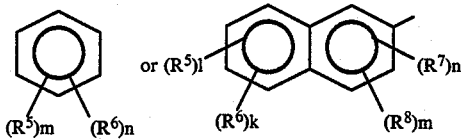

(in which $R^5$, $R^6$, $R^7$ and $R^8$ each represent a lower alkyl group, an amino group, a sulfonic acid group in the form of an alkali metal salt, or a carboxyl group in the form of an alkali metal salt); $R^3$ and $R^4$ each represent a lower alkyl group, an amino group, a sulfonic acid group in the form of an alkali metal salt, or a carboxyl group in the form of an alkali metal salt, and k, l, m and n each represent an integer of 0, 1 or 2.

DETAILED DESCRIPTION OF THE PREFERRED EMBODIMENTS

As mentioned previously, the dye having the formula (I) has high solubility in water and polyhydric alcohols and is excellent in color tone, but has poor light resistance. The dye having the formula (II) has excellent light resistance, but the solubility in water and polyhydric alcohols is not high and the color tone is slightly inferior.

Since the affinity between the dye of the formula (I) and the dye of the formula (II) is high and the dye of the formula (I) is very soluble in water and polyhydric alcohols, a mixture of the dye of the formula (I) and the dye of the formula (II) is highly soluble in water and polyhydric alcohols and significantly resistant to light, possibly because the dye of the formula (II) having high light resistance protects the dye of the formula (I) when they are mixed. As a result, this mixture is suitable as a magenta dye composition for ink jet printing.

It is preferable that the mixing ratio of the dye of the formula (I) to the dye of the formula (II) in terms of part by weight be (1:3) to (3:1) and the total amount of the two dyes in the aqueous ink according to the present invention be in the range of 2.0 wt.% to 5.0 wt.% of the entier weight of the aqueous ink.

As the water-soluble organic solvent having a boiling point of 100° C. or higher, ethylene glycol, diethylene glycol, triethylene glycol, tetraethylene glycol, polyethylene glycols (having a molecular weight of about 200, about 300 and about 400) and glycerol and mixtures thereof can be employed. When the boiling point of such organic solvents is below 100° C., the solvents readily evaporate from the ink composition, so that the nozzles are plugged with the solid components of the ink during a non-use period.

As the preservative and anti-mold agents, for example, 2,2-dimethyl-6-acetoxy-dioxane-1,3-dehydrosodium acetate, p-hydroxy benzoic acid butyl ester, potassium sorbate, 2-pyridine thiol-1-oxidesodium salt, anionic surface active agents, Deltop 33 (commercialy available from Takeda Chemical Industries Ltd.), and Bioside 880 (commercially avaialbe from Taisho Co., Ltd.) can be employed.

Further it is preferable that the pH of the aqueous ink according to the present invention be in the range of about 9.7 to about 10. If the pH is less than 9.7, the ink absorbs a $CO_2$ gas contained in the air, so that the pH of the ink is decreased and the metallic portions (for instance, made of Ni) of the nozzles are corroded with time.

Specific examples of the dye of the formula (II) for use in the present invention are as follows:

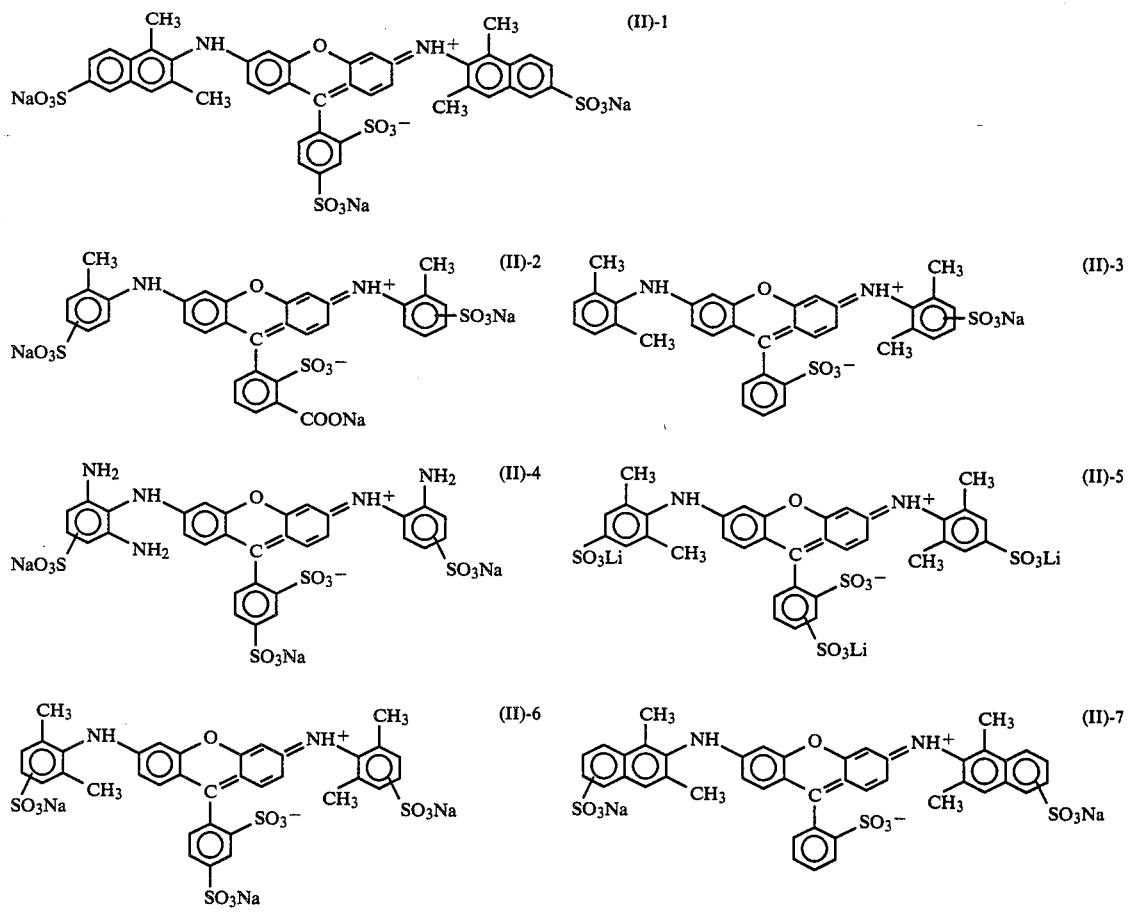

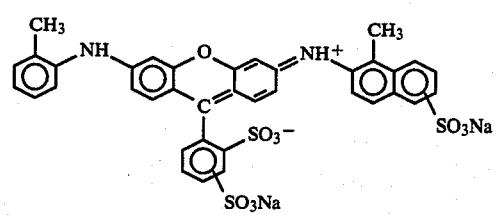 (II)-8

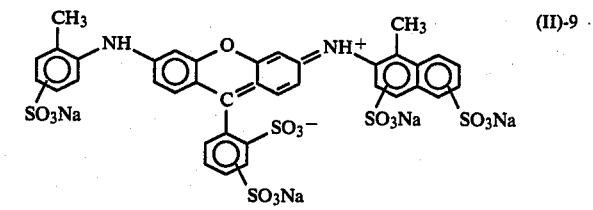 (II)-9

By referring to the following examples, the present invention will now be explained in detail.

EXAMPLE 1

A mixture of the following components was prepared:

|  | Parts by Weight |
| --- | --- |
| Magenta dye (I) | 2.5 |
| Magenta dye (II)-1 | 1.0 |
| Glycerol | 10 |
| Diethylene glycol | 10 |
| Preservative and anti-mold agent (Deltop 33 commercially available from Takeda Chemical Industries, Ltd.) | 0.5 |
| Ion-exchanged water | 75 |

To the above mixture, a small amount of sodium carbonate was added so that the pH of the mixture was adjusted to be 10. The mixture was heated to 70° C., stirred at the same temperature for 4 hours and then filtered through a membrane filter with a 0.22 μm mesh, whereby an aqueous ink No. 1 according to the present invention was prepared.

EXAMPLE 2

A mixture of the following components was prepared:

|  | Parts by Weight |
| --- | --- |
| Magenta dye (I) | 2.5 |
| Magenta dye (II)-3 | 1.5 |
| Glycerol | 20 |
| Diethylene glycol | 25 |
| Preservative and anti-mold agent (Deltop 33 commercially available from Takeda Chemical Industries, Ltd.) | 0.5 |
| Ion-exchanged water | 60 |

To the above mixture, a small amount of sodium hydroxide was added so that the pH of the mixture was adjusted to be 9.7. The mixture was heated to 70° C., stirred at the same temperature for 4 hours and then filtered through a membrane filter with a 0.22 μm mesh, whereby an aqueous ink No. 2 according to the present invention was prepared.

EXAMPLE 3

A mixture of the following components was prepared:

|  | Parts by Weight |
| --- | --- |
| Magenta dye (I) | 1.5 |
| Magenta dye (II)-4 | 1.0 |
| Magenta dye (II)-6 | 2.0 |
| Glycerol | 25 |
| Diethylene glycol | 20 |
| Preservative and anti-mold agent (Deltop 33 commercially available from Takeda Chemical Industries, Ltd.) | 0.5 |
| Ion-exchanged water | 50 |

To the above mentioned, a small amount of sodium hydroxide was added so that the pH of the mixture was adjusted to be 9.8. The mixture was heated to 70° C., stirred at the same temperature for 4 hours and then filtered through a membrane filter with a 0.22 μm mesh, whereby an aqueous ink No. 3 according to the present invention was prepared.

Comparative Example 1

A mixture of the following components was prepared:

|  | Parts by Weight |
| --- | --- |
| Magenta dye (I) | 3.5 |
| Glycerol | 10 |
| Diethylene glycol | 10 |
| Preservative and anti-mold agent (Deltop 33 commercially available from Takeda Chemical Industries, Ltd.) | 0.5 |
| Ion-exchanged water | 75 |

To the above mixture, a small amount of sodium carbonate was added so that the pH of the mixture was adjusted to be 10. The mixture was heated to 70° C., stirred at the same temperature for 4 hours and then filtered through a membrane filter with a 0.22 μm mesh, whereby a comparative aqeuous ink No. 1 was prepared.

Comparative Example 2

A mixture of the following components was prepared:

|  | Parts by Weight |
| --- | --- |
| Magenta Dye (II)-1 | 3.5 |
| Glycerol | 10 |
| Diethylene glycol | 10 |
| Preservative and anti-mold agent (Deltop 33 commercially available from Takeda Chemical Industries, Ltd.) | 0.5 |
| Ion-exchanged water | 75 |

To the above mixture, a small amount of sodium carbonate was added so that the pH of the mixture was adjusted to be 10. The mixture was heated to 70° C., stirred at the same temperature for 4 hours and then filtered through a membrane filter which a 0.22 μm mesh, whereby a comparative aqeuous ink No. 2 was prepared.

The thus prepared aqueous inks No. 1 through No. 3 according to the present invention and the comparative aqueous inks No. 1 and No. 2 were subjected to the following tests:

Test 1

100 g of each aqueous ink was filtered through a 0.5 μm mesh membrane filter under a pressure of 2 atm and the time $t_1$ required to filter the ink through the membrane filter was measured. Each ink, without being filtered, was preserved for 2 months at a cooling and heating cycle of $-10°$ C. for 12 hours and 40° C. for 12 hours. After this preservation test, the ink was filtered through the same membrane filter in the same manner as mentioned above and the time $t_2$ required to filter the ink was measured and the increased percentage of the time required for filtering the ink after the preservation test to the time required for filtering before the preservation test, that is, $$(t_2 - t_1)/t_1 \times 100\%$$

was calculated.

Test 2

The same aqueous ink was charged in 10 ink jet heads each having one nozzle having a diameter of 40μm, and was caused to issue from the ink jet heads with a pressure of 3.5 kg/cm$^2$ and with vibrations at a frequency of 100 KHz to a sheet of plain paper which was placed at a distance of 30 mm from the nozzles, whereby the first ink-impinging position was determined. The ink was allowed to stand at 40° C., 30% RH for 2 months without being used for subjecting the ink to a non-use test. After this non-use test, the ink was again caused to issue from the 10 ink jet heads to the plain paper under the same conditions as mentioned above, so that the second ejected position was determined. Thus the deviation of the second ink-impinging position from the first ink-impinging position was obtained.

Test 3

The density $d_1$ of an image printed on the plain paper in the above Test 2 was first measured and the image was exposed to light by a carbon arc lamp at 40° C., 80% RH for 5 hours, so that the image density $d_2$ of the image exposed to the light was measured. The percentage of the decrease in the image density after the exposure, that is, $$(d_1 - d_2)/d_1 \times 100\%$$

was obtained.

The results of the above tests are summarized in the following table:

TABLE

| Aqueous Ink | Test 1 (%) | Test 2 (μm) | Test 3 (%) |
|---|---|---|---|
| No. 1 | 4 | 40 | 8 |
| No. 2 | 7 | 25 | 6 |
| No. 3 | 5 | 18 | 7 |
| Comp. Ink No. 1 | 21 | 23 | 35 |
| Comp. Ink No. 2 | 26 | 145 | 5 |

In Test 1, it is preferable that the percentage of the increase in the filtering time be not more than 10%.

In Test 2, it is preferable that the derivation be not more than 100 μm.

In Test 3, it is preferable that the fading ratio be not more than 10%.

The results in the above table indicate that the aqueous inks according to the present invention are far better in the preservability, ejection stability and light resistance than the comparative aqueous inks in which not a combination of the magenta dye of the formula (I) and the magenta dye of the formula (II), but either the magenta dye of the formula (I) or the magenta dye of the formula (II) was employed.

What is claimed is:

1. In an aqueous ink comprising a water-soluble organic solvent having a boiling point of 100° C. or higher, water and a preservative and an anti-mold agent, the improvement comprising a first magenta dye having the formula (I) and a second magenta dye having the formula (II):

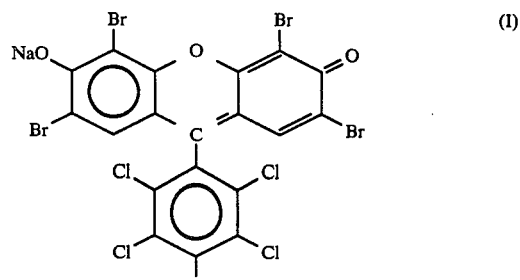

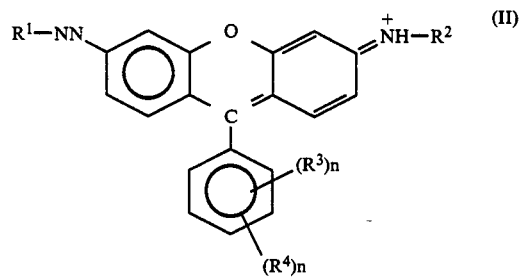

wherein $R^1$ and $R^2$ each represent

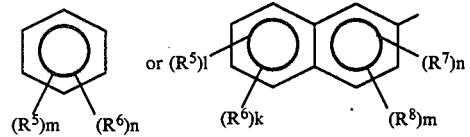

(in which $R^5$, $R^6$, $R^7$ and $R^8$ each represent a lower alkyl group, an amino group, a sulfonic acid group in the form of an alkali metal salt, or a carboxyl group in the form of an alkali metal salt); $R^3$ and $R^4$ each represent a lower alkyl group, an amino group, a sulfonic acid group in the form of an alkali metal salt, or a carboxyl group in the form of an alkali metal salt; and k, l, m and n each represent an integer of 0, 1 or 2.

2. An aqueous ink as claimed in claim 1, wherein the mixing ratio of said first magenta dye to the second magenta dye is in the range of (1:3) to (3:1).

3. An aqueous ink as claimed in claim 1, wherein the total amount of said first magenta dye and said second magenta dye is in the range of 2.0 wt.% to 5.0 wt.% of the entire weight of said aqueous ink.

4. An aqueous ink as claimed in claim 1, wherein said second magenta dye is selected from the group consisting of

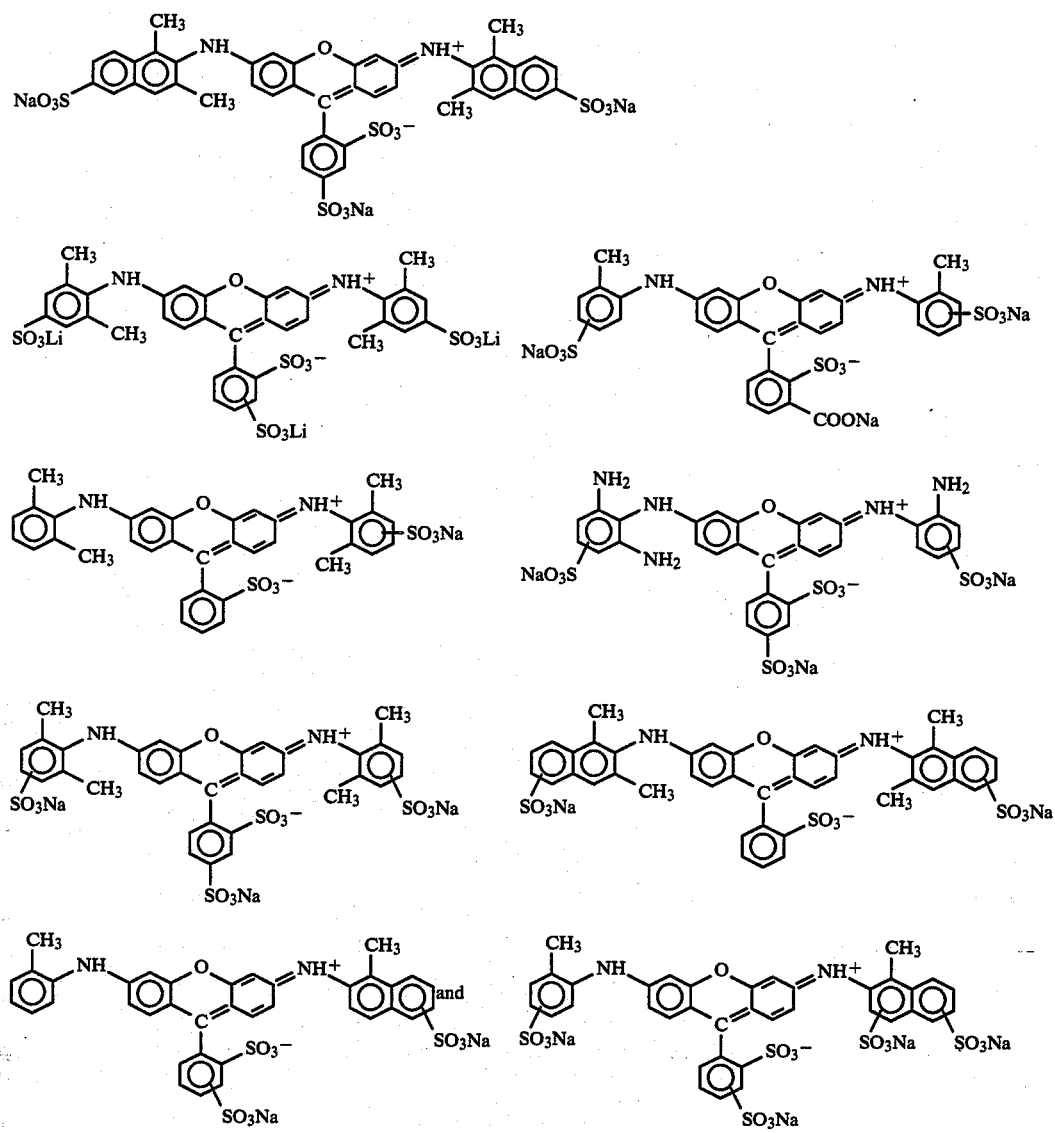

5. An aqueous ink as claimed in claim 1, wherein said water-soluble organic solvent is selected from the group consisting of ethylene glycol, diethylene glycol, triethylene glycol, tetraethylene glycol, polyethylene glycols and glycerol and mixtures thereof.

6. An aqueous ink as claimed in claim 1, wherein said preservative and anti-mold agent is selected from the group consisting of 2,2-dimethyl-6-acetoxy-dioxane-1,3-dehydrosodium acetate, p-hydroxy benzoic acid butyl ester, potassium sorbate, 2-pyridine thiol-1-oxidesodium salt and anionic surface active agents.

* * * * *